(12) United States Patent
Dippenaar

(10) Patent No.: US 9,172,621 B1
(45) Date of Patent: Oct. 27, 2015

(54) UNIFIED ACCOUNT METADATA MANAGEMENT

(71) Applicant: Amazon Technologies, Inc., Reno, NV (US)

(72) Inventor: Andries Petrus Johannes Dippenaar, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 383 days.

(21) Appl. No.: 13/854,653

(22) Filed: Apr. 1, 2013

(51) Int. Cl.
*G06F 15/173* (2006.01)
*H04L 12/26* (2006.01)

(52) U.S. Cl.
CPC .................................. *H04L 43/045* (2013.01)

(58) Field of Classification Search
CPC ... H04L 29/08072; H04L 26/06; H04L 43/00; H04L 12/2602; H04L 41/22
USPC .......................................................... 709/224
See application file for complete search history.

(56) References Cited

U.S. PATENT DOCUMENTS

| | | | |
|---|---|---|---|
| 5,825,361 | A | 10/1998 | Rubin et al. |
| 7,143,392 | B2 | 11/2006 | Li et al. |
| 7,523,126 | B2 | 4/2009 | Rivette et al. |
| 7,620,913 | B2 | 11/2009 | Hida et al. |
| 7,788,214 | B2 | 8/2010 | Fernandez et al. |
| 2007/0198667 | A1* | 8/2007 | Behrendt et al. ............... 709/220 |
| 2008/0077875 | A1 | 3/2008 | Li et al. |
| 2008/0155335 | A1* | 6/2008 | Klein et al. ..................... 714/37 |
| 2010/0110932 | A1 | 5/2010 | Doran et al. |
| 2010/0153862 | A1* | 6/2010 | Schreiber ....................... 715/760 |
| 2010/0306275 | A1* | 12/2010 | Maheshwari et al. ........ 707/803 |
| 2011/0231429 | A1* | 9/2011 | Wada et al. .................... 707/769 |
| 2012/0311157 | A1 | 12/2012 | Erickson et al. |
| 2012/0331521 | A1 | 12/2012 | Ansari |
| 2013/0019235 | A1 | 1/2013 | Tamm |
| 2014/0025998 | A1* | 1/2014 | Schimmelpfeng et al. ...... 714/39 |
| 2014/0181130 | A1* | 6/2014 | Davis et al. .................... 707/758 |
| 2014/0280197 | A1* | 9/2014 | Gatto et al. .................... 707/741 |

OTHER PUBLICATIONS

Ziegler, L.; Kunz, C.; Botsch, V.; Schneeberger, J., "Visualizing and exploring large networked information spaces with matrix browser," Information Visualisation, 2002. Proceedings. Sixth International Conference on , vol., No., pp. 361,366, 2002 doi: 10.1109/IV.2002. 1028800.*
U.S. Appl. No. 13/524,982, filed Jun. 15, 2012, Gregory B. Roth et al.
Dr. Rupert Ogilvie "Cloud Computing 3D: Seeing Through the Clouds", www.real-status.com, Real Status Ltd., Jan. 2, 2011 pp. 1-7.
"Hyperglance 2.0 Technical Overview" www.real-status.com, Real Status Ltd., Aug. 28, 2012 pp. 1-2.

* cited by examiner

*Primary Examiner* — Kostas Katsikis

(74) *Attorney, Agent, or Firm* — Robert C. Kowert; Meyertons, Hood, Kivlin, Kowert & Goetzel, P.C.

(57) ABSTRACT

Methods and apparatus for unified account metadata management are disclosed. A storage medium stores program instructions that when executed on a processor generate a graph representation of metadata associated with a client account of a provider network. At least a portion of the metadata is obtained using an internal mechanism of the provider network. The graph comprises a plurality of nodes (representing resources associated with the client account) and a plurality of edges (representing configuration relationships). The instructions when executed provide a visualization of resources and configuration relationships of the graph; and in response to a graphical interaction with the visualization, issue a command to a network-accessible service of the provider network to implement a configuration modification associated with a resource represented in the graph.

30 Claims, 9 Drawing Sheets

UNIFIED ACCOUNT METADATA MANAGEMENT

BACKGROUND

More and more computing applications are being migrated to cloud environments, in which resources of a provider network are typically deployed to provide a variety of multi-tenant and/or single-tenant services to large numbers of users. Provider network resources may support a number of basic infrastructure services providing virtual or physical compute servers, storage devices, networking devices and the like, as well as more complex layered services built on top of the basic services. One service may provide virtualized compute servers, for example, another may provide block storage volumes, another may provide key-value based storage objects, while other services may utilize such more basic infrastructure-oriented services to provide more complex entities such as load-balanced compute/storage clusters or farms, relational or non-relational database servers, content-distribution services, private networks in the cloud, and the like.

A given client may often utilize a number of different provider network services, and may in some cases have hundreds or even thousands of different, often-interrelated resources allocated at a given time. Some resources may be associated with a multiplicity of services—e.g., a client may obtain a networking resource such as a virtual network interface from one service, and deploy that virtual network interface for a database provided by another service. Similarly, a given storage resource acquired by a client may be utilized concurrently for storing data associated with several different services.

At least in some provider network environments, user interfaces such as web-based consoles are typically provided to enable clients to view and administer aspects of the services they are using, and the resources that have been allocated to them. Such consoles and other similar tools are often designed to focus primarily on a single service, however. Users of such interfaces may have to switch back and forth between different consoles or other interfaces as they try to manage their services and resources usage. Often, especially as the number of resources associated with a client account increases, it may not be easy to obtain an intuitive big-picture view of the services in use by, and the resources assigned to, the client account.

Figure 1:
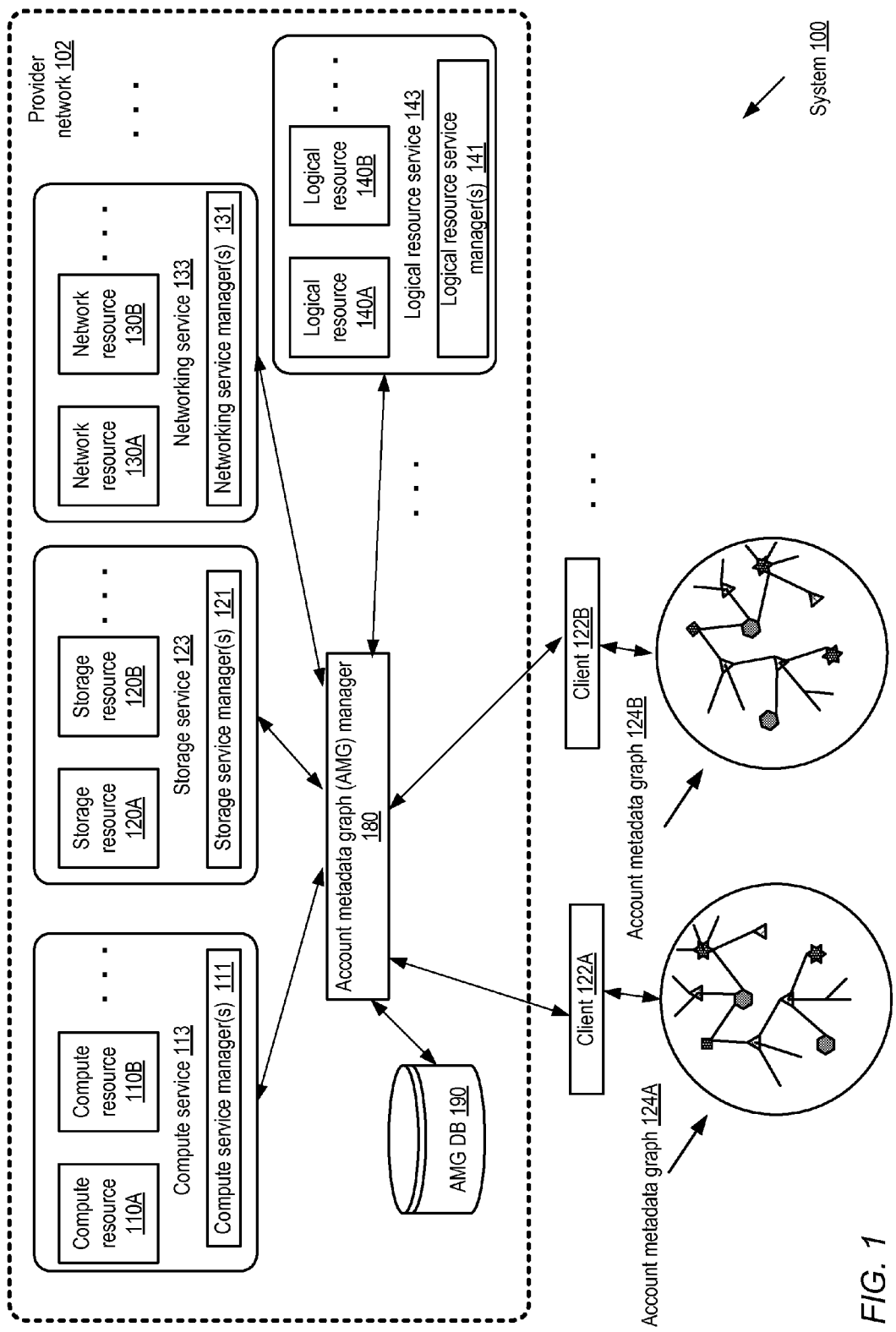
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing unified account metadata management in a provider network environment are described. Networks set up by an entity such as a company or a public sector organization to provide one or more services (such as various types of cloud-based computing or storage services) accessible via the Internet and/or other networks to a distributed set of clients may be termed provider networks in this document. A given provider network may include numerous data centers (which may be distributed across different geographical regions) hosting various resource pools, such as collections of physical and/or virtualized computer servers, storage devices, networking equipment and the like, needed to implement, configure and distribute the infrastructure and services offered by the provider. A given client account (e.g., a given entity that is billed for the use of services and associated resources of the provider network) may utilize several different provider network services, and may have a number of provider network resources assigned or allocated at a given time. It is noted that a given client account may map to one or more human users—e.g., in some cases a company or a department within a company may set up a single client account, and all the individual users from that company or that department may use the provider network under the same umbrella client account; in other cases, separate client accounts may be set up for each individual user. In some implementations, users may each be provided a separate user account (e.g., with a login name and password); in such embodiments, a client account may thus be associated with one or more user accounts In at least some embodiments, an account metadata manager implemented by the provider network may be configured to provide a unified view of all the services in use by a given client account, including, for example, easy-to-use graph representations of the resources assigned/allocated to the client account, attributes or properties of the various resources, and the configuration relationships between the various resources. Such an account metadata manager may be referred to herein as a multi-service account metadata manager, and the unified representations/views may be referred to as multi-service representations/views. A unified graph representation of various services and resources associated with a client account may be referred to herein as an account metadata graph (AMG), and the collection of software and/or hardware responsible for generating and managing the AMG may be referred to as an AMG manager. In at least some embodiments, an AMG manager may be configured to use one or more private, internal mechanisms (e.g., non-public programmatic interfaces or techniques accessible only to trusted entities within the provider network) for at least some of its operations. Authorized users associated with the client accounts may be provided access to the AMG, e.g., via special interfaces such as hyperbolic tree browsers, other graphical or web-based user interfaces, and/or via one or more application programming interfaces (APIs) such as REST (representational state transfer) APIs or SOAP (Simple Object Access Protocol) APIs in various embodiments. In at least some embodiments, in addition to being able to view or read information about various resources and services, users may be able to modify resource and/or service configuration using the interfaces provided—e.g., in one implementation, a client may be able to attach/detach a storage volume to a compute server using a graphical interaction, or transfer an IP address from one resource to another via a graphical interaction. A number of different hardware and/or software components, some of which may be instantiated or executed at different data centers or in different geographical regions, may collectively be used to manage and provide access to multi-service account metadata in various embodiments.

According to one embodiment, a system for implementing unified multi-service account metadata management may comprise one or more computing devices. The devices may be configured to receive an indication of a client account of a provider network, where the client account is associated with respective sets of resources of one or more network-accessible services of the provider network. The devices may obtain metadata (such as configuration-related information) pertaining to the respective sets of resources from the one or more network-accessible services, e.g., by issuing respective sets of API calls to each of the services. Some of the API calls used to obtain metadata may be non-public in at least some embodiments, and/or some of the resources (e.g., administrative network paths or internal-use-only caches) used may not be accessible to third parties or to the clients of the provider network. The computing devices may generate a graph representation of the metadata (i.e., an AMG) comprising a plurality of nodes and a plurality of edges linking respective pairs of nodes. For example, a first node and a second node may represent a respective first and second resource associated with the client account, and an edge between the first node and the second node may represent a configuration relationship established on behalf of the client between the first and second resources. Various types of resources may be represented by nodes in the AMG in different embodiments—e.g., the first node may represent a compute server allocated to the client account by a compute service of the provider network, the second node may represent a storage object (such as a volume) allocated to the client account by a storage service of the provider network, a third node may represent a network device usable by the compute server and provided by a networking service of the provider network, and a fourth node may represent a logical or aggregated resource (such as a database system or a load balancer) accessible to the compute server and implemented by a different service of the provider network.

The computing devices providing the unified multi-service metadata functionality may be configured to implement one or more programmatic interfaces for programmatic access and/or manipulation of the metadata in at least some embodiments. In one embodiment, a customizable visualization of resources and configuration relationships included in the graph representation may be provided, for example using a hyperbolic tree browser in which a fish-eye view of a selected subset of resources and/or services may be displayed. Interfaces supported by the account metadata manager may also enable configuration modifications in some embodiments, initiated for example via authorized graphical interactions with the visualization, e.g., to change the configuration relationship between resources represented by nodes in the graph, or to change attributes of the nodes or edges. When an authorized graphical interaction is received via a programmatic interface (e.g., via one or more mouse-clicks or drag-and-drop operations), a corresponding set of one or more commands may be issued to one or more network-accessible services to implement a requested configuration modification associated with resources indicated in the graphical interaction. In some embodiments, one or more of the network-accessible services of the provider network may support a corresponding administrative API, and the metadata manager may submit corresponding API calls to the services to implement requested configuration changes and/or to query or read configuration metadata. In one embodiment, some of the configuration changes may involve the use of non-public mechanisms as well, e.g., the metadata manager may use internal or private APIs not exposed to third parties or to clients to achieve the desired configuration changes more efficiently (and/or more securely) than would have been possible using public APIs.

The AMG and/or the corresponding visualizations may be refreshed or modified in response to the configuration changes in some embodiments. For example, if an authorized user submits a request to make a configuration change X associated with services S1 and S2 associated with nodes N1 and N2, the account metadata manager may submit corresponding API requests to the service managers of S1 and S2, and if the API requests succeed, a changed view of the nodes N1 and/or N2 may be provided in the visualization to the authorized user, visually indicating that the requested configuration change has indeed occurred. In addition to the visualization change, the underlying data structures used to store the AMG may also be modified, and the data structure changes may be stored to persistent storage in at least some such embodiments. In one embodiment, recent configuration changes may be highlighted in the visualizations of the AMG—e.g., the last N changes made may be highlighted, or the changes made in the last T minutes may be highlighted, using bold symbols, icons or contrasting colors. In some implementations the AMG manager may maintain and store a configuration audit trail (e.g., a collection of timestamped records indicating some number of recent configuration changes and the times at which they occurred), and such an audit trail may be used to determine which elements of the visualization should be highlighted.

In some embodiments, authorization information may be maintained and/or displayed at various levels of the account metadata graphs. For example, account-level metadata may be maintained in one embodiment, governing such aspects of the metadata management as which users should be allowed to view/browse the AMG, which users should be allowed to modify attributes of the AMG or its visualizations, and so forth. Node-level authorization information may be maintained for at least a subset of the nodes representing resources assigned to the client account in some embodiments. At least two types of node-level authorization information may be stored and used in some embodiments: (a) authorization information for human users associated with the client account, indicating which users are allowed to view or modify the resources represented by the nodes or the configuration relationships between nodes and (b) authorization information associated with the resources themselves, e.g., governing which types of configuration operations a given compute server resource represented by a node is permitted to initiate via API interactions. In other embodiments, only one of these two types of node-level authorization information may be maintained. Authorization information may also be stored for edges of the AMG in some embodiments, indicating for example which entities are allowed to view or change the configuration relationships represented by the edges. In some embodiments, distinct authorization information may also be stored for respective attributes of nodes or edges. In at least some embodiments, the authorization information maintained for an account, nodes or edges in the AMG associated with the account may be used when generating a visualization of the account—e.g., depending on which user is viewing the AMG, the contents (e.g., the set of nodes and/or edges displayed) of the visualization may differ in accordance with the authorization information. In one implementation, authorization information may be indicated within the visualization, e.g., by highlighting or coloring the nodes/edges to which a user has access or modification rights, and/or by greying out or discoloring the nodes/edges to which the user does not have access or modification rights. In some embodiments, authorization information may be displayed in response to graphical interactions, e.g., a user may be able to view authorization information associated with a given node or edge by right-clicking on the node or edge.

As indicated above, in some embodiments, some or all of the resources represented in an AMG may be authorized to query the AMG and/or to perform configuration changes that modify the AMG. For example, in one embodiment, instead of requiring a client account's credentials or a specific user's credentials to be used when making certain types of configuration changes, the provider network may enable authorization roles (with associated credentials) to be assigned to resources such as compute instances or servers, enabling some types of operations to be initiated by the compute instances without supplying the client or user credentials. A client may assign a particular role or a set of capabilities (e.g., roles or capabilities defined by an identity and authorization management (IAM) service of the provider network) to a compute instance in one such embodiment. The credentials may be assigned via graphical interactions supported via an AMG visualization interface in at least some embodiments. Once the role/capability has been assigned, corresponding credentials may be made available to the resource, and the resource may be able to browse/modify at least a portion of the AMG, e.g., using one or more REST API queries or SOAP queries supported by the AMG manager. Node-level authorization information maintained for the AMG in some embodiments may include a "query depth limit" indicating a limit on the number of graph edges that may be traversed to respond to a request from a given resource represented by a node in the AMG, and thereby placing constraints on how much information can be obtained programmatically by the resource. For example, by default, in one embodiment the query depth limit may be set to three, so that a given resource R represented by a node N in an AMG may only have access to configuration information that can be obtained by traversing the graph no further than three hops (edges) away from N.

In at least some embodiments, access policy changes (e.g., changes to policies applicable to various groups of resources and/.or services) may be accomplished using graphical interactions with the AMG visualizations. Upon receiving such an access policy change request, the AMG manager may translate the request to the corresponding access policy language requests and transmit the translated requests to the appropriate policy managers. In some embodiments, graphical interactions with AMG visualizations may be used to assign roles, capabilities, credentials or permissions to various entities such as resources represented in the AMGs, or to other users associated with the client account. In response to a request to assign a role, capability, credential, or permission, the AMG manager may issue a corresponding set of API requests to an identity and access management service of the provider network in some embodiments.

In one embodiment, various types of accounts associated with the provider network may be linked to each other. For example, a parent company-level client account may be created for a company whose employees wish to use the provider network services, and several department-level sub-accounts may be linked to the parent company-level account. An AMG may display edges indicating the parent-child account relationships, and/or the peer relationships between the accounts of different departments in such a scenario. If one account or sub-account provides resources to another account, e.g., one department A may allow users in another department B to temporarily use compute instance assigned to department A, in some embodiments an AMG may display a provider-consumer relationship in an AMG associated with either department or with the parent company. In some embodiments, one or more of the various services implemented in the provider network may be represented in an AMG as an administrator account, and resources of the administrator account may be represented (e.g., as read-only nodes) in the AMG of a client account.

In some embodiments, in addition to information about service and/or resource metadata, an AMG may also store or display other types of information associated with an account. For example, in one embodiment a provider network may implement a network-accessible content service, enabling clients to rent and/or purchase videos, music, books, and the like. In such an embodiment, an AMG for a client account may include a sub-graph indicating the content items purchased by or rented by users affiliated with the client account. Billing history and/or other billing-related information associated with a client account may be presented as a sub-graph of an AMG in some embodiments. In one embodiment, support history associated with the client account may be included as a sub-graph of an AMG—e.g., a history of customer support interactions between the users associated with the client account, and the customer service organizations of the provider network, may be shown in the AMG.

Example System Environment

FIG. 1 illustrates an example system environment, according to at least some embodiments. As shown, system 100 may include a provider network 102 set up to support network-accessible services for various clients such as client 122A and client account 122B. Several different types of services may be supported by the provider network 102, including for example one or more compute services such as compute service 113, one or more storage services such as storage service 123, networking-related services such as networking service 133, and various additional services such as logical resource service 143. Logical resources 143 may include such entities as database server instances, load balancers, security groups, and the like, that may typically be implemented using a collection of lower-level services of the provider network 102 and/or may represent collections or abstractions of other resources or metadata. Each of the services may utilize respective sets of resources of the provider network—for example, a number of physical and/or virtual computing devices may be set up in various data centers and allocated to various clients as needed as compute server instances. Each service may have a set of one or more service managers to coordinate the allocation and use of the resources to deliver the service functionality. As shown, compute service manager(s) 111 may coordinate the use of compute resources 110 (such as 110A and 110B), storage service manager(s) 121 may coordinate the use of storage resources 120 (such as 120A and 120B) to provide various types of storage functionality, networking service manager(s) 131 may coordinate the delivery of networking-related functions using network resources 130 (such as 130A and 130B), and logical resource service manager(s) 141 may coordinate the implementation and delivery of logical resources 140 (such as 140A and 140B).

The provider network services may have a plurality of users, each affiliated with one or more client accounts in the depicted embodiment. It is noted that although, for ease of presentation, the term "client" may be used herein to refer to a user associated with a client account, a given client account may correspond to one or more individual users in at least some embodiments, and in other embodiments an individual user may be associated with more than one client account. Thus, in general, an M:N relationship may exist between client accounts and users, in which either M or N or both may be greater than or equal to one. The phrase "the client account" may be used herein as an equivalent of the phrase "users affiliated with the client account"—for example, the resources being used by users affiliated with a client account C may be referred to as "the resources being used by the client account C".

The user or users associated with a given client account may utilize several of the services offered by the provider network. For example, one or more users affiliated with a given client account may use a number of compute instances assigned by a compute service 113, several storage devices such as volumes or files managed with the help of storage service 123, a number of networking-related entities such as virtual network interfaces and/or network addresses provided by networking service(s) 133, as well as higher-level logical constructs such as load balancers, security groups and the like provided by one or more logical resource services 143. At least some of the services may maintain respective sets of metadata indicative of, for example, the specific resources currently assigned to clients of the service, configuration settings and parameters, service-level agreements, resource utilization metrics, and so on.

In the embodiment of FIG. 1, an account metadata graph (AMG) manager 180 may responsible for generating, storing and providing a unified view of the services and resources associated with a given client account to various entities, including for example to the user(s) affiliated with the account and/or resources of the provider network. In one embodiment, in response to receiving an indication of a particular client account, the AMG manager 180 may be responsible for obtaining respective sets of metadata pertaining to the client account from each of one or more services of the provider network 102 that is being utilized by the client account. The indication of the client account may be received, for example, in an account view request or a graph generation request in some embodiments, as described below in further detail in conjunction with the description of FIG. 3. In response to the request, the AMG manager 180 may issue one or more API calls or queries to each of one or more services such as compute service(s) 113, storage service(s) 123, networking service(s) 133 and/or logical resource service(s) 143 to collect the respective sets of metadata. The API calls may lead the corresponding service managers to look up metadata in their respective administrative databases indicating, for example, which resources are currently being used by the client account, configuration relationships between various resources, attributes, settings or parameters for the client or for the client's resources, and so forth. As mentioned above, in at least some embodiments the AMG manager 180 may use internal administrative mechanisms (e.g., service APIs or network paths accessible only to trusted parties within the provider network, or optimization techniques available only within the provider network) to obtain at least a subset of the metadata. In some cases, the AMG manager may get a response from a particular service manager SM for a service S indicating that the specified client account is not using the service S. In one embodiment, the entity that submits the account view request (which may for example be one of the users affiliated with the client account, or may be one of the resources of the provider network) may indicate the set of services to be queried for metadata. In other embodiments the request may not specify the relevant services and, to ensure that a complete unified view of the account is generated, the AMG manager 180 may have to query several services that may or may not be in use by the client account.

Figure 2:
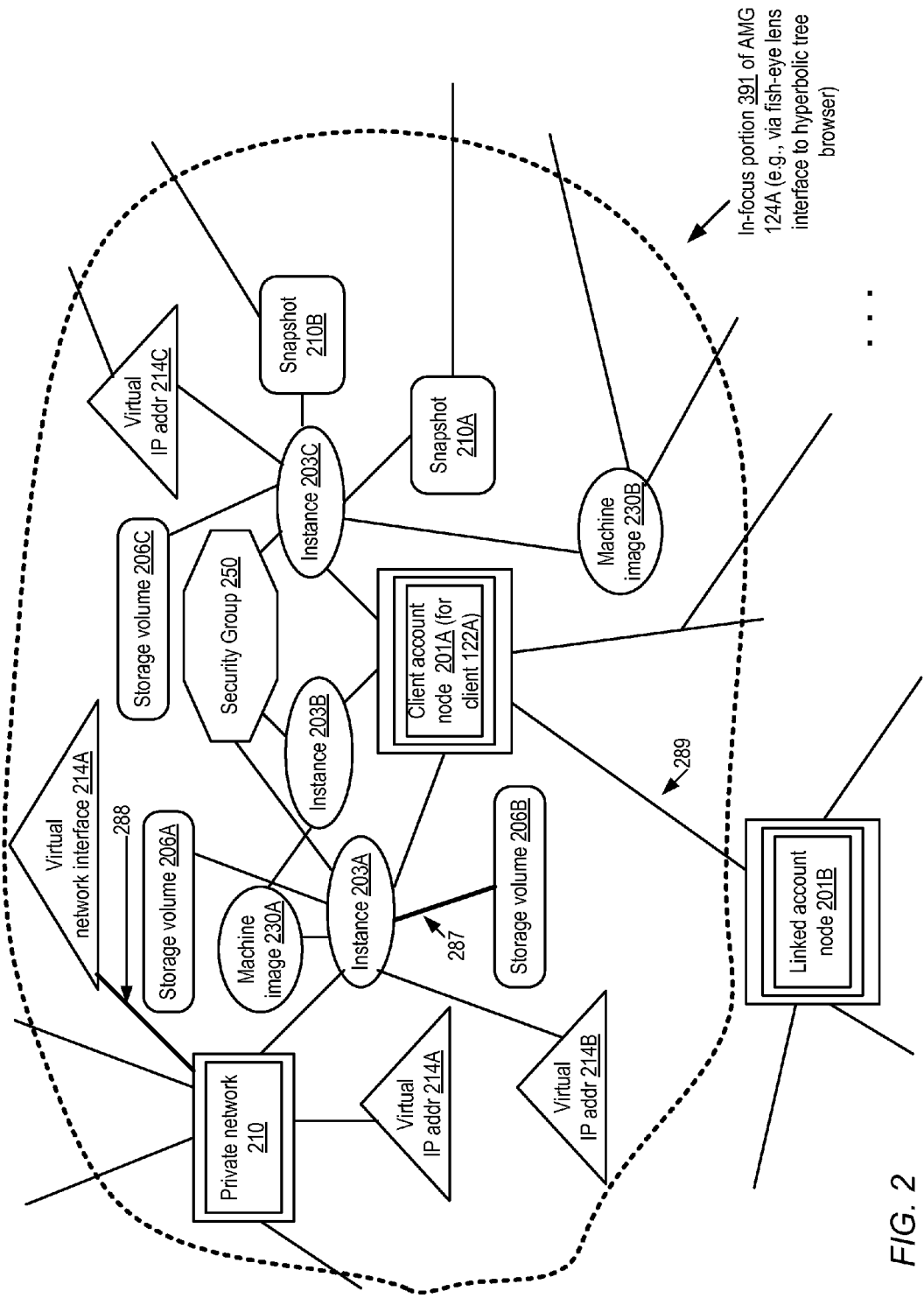
FIG. 2 illustrates examples of nodes that may be included in a graph representation of account metadata, according to at least some embodiments.

Having obtained the pertinent metadata from one or more services, in some embodiments the AMG manager 180 may generate a graph representation of the metadata, comprising a plurality of nodes and a plurality of edges linking respective pairs of nodes. Some or all of the nodes may represent respective resources, while some or all of the edges may represent configuration relationships between resources in the depicted embodiment. A wide variety of resources and configuration information may be represented in the graph, including for example compute servers, storage objects, networking objects, logical resources of various kinds, applications or operating systems running on one or more resources, and the like. Examples of graph nodes according to some embodiments are illustrated in FIG. 2. In response to respective account view requests or graph generation requests for various client accounts, a respective account metadata graph 124 may be generated for each of the accounts, such as graph 124A for the account of client 122A and graph 124B for the account of client 122B in the depicted embodiment. Data structures comprising programmatic representations of a graph 124, such as any of various types of tree-oriented data structures, may be generated and stored in a persistent store such as account metadata graph database (AMG DB) 190 in the depicted embodiment.

In some embodiments, the AMG manager 180 may present one or more visualization interfaces allowing users to view, browse, manipulate and/or modify various aspects of the graph. For example, in one embodiment, the AMG manager 180 may implement one or more programmatic interfaces (such as standalone or web-accessible graphical user interfaces) providing a customizable visualization of resources and configuration relationships included in the graph representation. A hyperbolic tree browser may be supported in one embodiment, enabling users to focus in on a selected subset of the nodes/edges of the graph using the equivalent of a fish-eye lens view, while simultaneously viewing a high-level visualization of larger portions of graph, or the entire graph.

Authorized users may be enabled to submit configuration change requests via the visualization interface in at least some embodiments—e.g., portions of the visualization or display may be modified via graphical interactions (such as drag-and-drop operations, or attribute edit operations) to achieve corresponding configuration changes within the provider network. In response to a particular authorized graphical interaction received via a programmatic interface associated with a visualization, the AMG manager 180 may issue one or more commands to a service of the one or more network-accessible services to implement a particular configuration modification associated with at least one resource associated with the AMG's client account in the depicted embodiment. The AMG manager 180 may determine whether the configuration commands resulting from the graphical interaction succeed or fail. If the configuration modification commands succeed, the visualization or display may be dynamically modified to reflect the change, e.g., by removing or adding an edge, by changing the color or line width associated with a symbol being used for a node, or by making other similar display changes.

The contents of the display or visualization provided by the AMG manager 180 may differ for different users in some embodiments, based at least in part on authorization information maintained for the AMG, for various nodes or edges included in the AMG. In at least some embodiments, the authorization information associated with an AMG or its subcomponents such as nodes and edges may be displayed as well, e.g., in response to context-dependent menu actions or by using color coding or line-width coding.

In at least some embodiments, some or all of the nodes represented in an AMG may be granted roles, capabilities or privileges to perform or initiate various configuration queries or actions, as described below in further detail. For example, an authorized resource represented by a node may be able to access (or modify) configuration information associated itself or with one or more other resources represented by nodes in one embodiment, using a REST API or a SOAP API provided by the AMG manager 180. Roles, capabilities and/or permissions may be granted to such resources (or revoked from such resources) using graphical interactions with the AMG visualizations in some embodiments. In some embodiments, broader access policies applicable to a plurality of resources and/or services may be modified via graphical or other programmatic interactions with AMGs. An AMG may include information about more than one client account in some embodiments, e.g., information about parent-child relationships with other accounts (e.g., when a given client account has a number of child accounts or sub-accounts), or about producer-consumer relationships (as when resources owned by one client account, termed a producer account, are shared with another account termed a consumer account), may be represented in the AMG. In some implementations, in addition to information about services and resources as described above, an AMG 124 may include representations such as sub-graphs of one or more other types of information associated with a client account, such as billing history, content purchase or rental history, or customer support history.

Example Account Metadata Graph Elements

FIG. 2 illustrates examples of nodes that may be included in a graph representation of account metadata, according to at least some embodiments. An in-focus portion 291 of hyperbolic tree-based visualization of a larger AMG 124 for a client 122A is shown in FIG. 2. The AMG is represented as a tree rooted at client account node 201A. A number of different types of resources associated with various provider network services are shown in the AMG. Nodes 203, such as 203A, 203B and 203C, for example, represent virtual compute instances or compute servers assigned to the client account represented by node 201A. In some implementations, some types of nodes may represent both a device on which a software application runs, and the software application itself—e.g., the same node may be deemed to represent a computing device and an operating system running on the device. In other implementations, software entities may be modeled as separate nodes from the devices on which they run, and the fact that the software entity runs on a device may be represented by an edge.

Instances 203A and 203C each have one or more storage resources configured. For example, instance 203A has storage volumes 206A and 206B attached, while instance 203C has access to storage volume 206C as well as snapshot objects 210A and 210B. (A snapshot may represent a point-in-time representation of a storage object or volume, for example). Node 250 represents a security group (asset of security-related rules that are common to a group of resources) set up for the compute instances 203A-203C. In the depicted embodiment, the compute instances 203 comprise virtual machines instantiated using pre-configured operating system and virtual application software bundles termed "machine images". The particular machine images that were used to instantiate the virtual machines for instances 203A, 203B and 203C are also represented in the AMG, by nodes labeled 230A (representing the machine image for instances 203A and 203B) and 230B (representing the machine image for instance 203C). Examples of networking-related resources such as virtual IP addresses 214A-C (e.g., IP addresses that can be dynamically remapped by clients as needed to instances), private network 210 (a cloud-based network emulating the network isolation and other features provided by physically-isolated private networks, which may be termed a "virtual private cloud" in some provider network environments) and virtual network interface 214A (a logical entity with a set of public and private IP addresses and security information, which can be dynamically attached/detached from instances to change networking configurations) associated with the account of client 122A are also shown in FIG. 2.

In the depicted example, an edge 289 is shown between the account of client 122A represented by node 201A, and node 201B representing a linked account. Two client accounts may be linked for any of a variety of reasons in different embodiments—e.g., in some scenarios multiple sub-accounts or child accounts may be set up under a given parent or umbrella account, and the linkage may represent a parent-child relationship. In another scenario, resources owned by or allocated to one account may be accessed by, loaned to, or referenced by another client account, in which case a producer-consumer relationship between the two accounts may be represented in an AMG. In one embodiment, service managers of one or more services of the provider network may be represented by administration accounts to which various clients' AMGs may show linkages, with resources associated with the administration accounts accessible only in read-only mode to clients. For example, in some embodiments, one or more template objects (such as a database server template or a load balancer template) may be provided by an administrator account, from which corresponding resource instances may be cloned or copied by clients, and the fact that a particular resource was cloned from a template may be illustrated in an AMG by linking the client account to the administrator account, and/or by linking the cloned node to a node representing the template object.

In at least some embodiments, graphical user interactions initiated by a client may be used to modify configuration relationships represented by edges in an AMG, and/or to modify node attributes. In the depicted embodiment, an authorized user may submit a request to detach storage volume 206B from instance 203A by clicking on edge 287, or by issuing a command from a drop-down menu associated with edge 287. Similarly, an authorized user may request a removal of virtual network interface 214A from private network 210 by clicking on edge 288 in the depicted example, or by using a menu brought up by clicking on edge 288. Drag-and-drop operations, as well as other graphical interactions, may also be used to request configuration changes, e.g., by dragging edge 287 to a different instance node than 203A, a request to detach the storage volume 206B from instance 203A and attach it to another instance may be submitted. As noted earlier, the set of nodes and edges shown to a particular user may depend on the authorization or permissions granted to the particular user in at least some embodiments. Users may select the specific subset of nodes and edges being displayed, zoom in to view additional details or attributes of the nodes and edges of their choice, or zoom out to obtain a more comprehensive view of the services and resources, using graphical interactions in various embodiments.

Interactions with the AMG Manager

Figure 3:
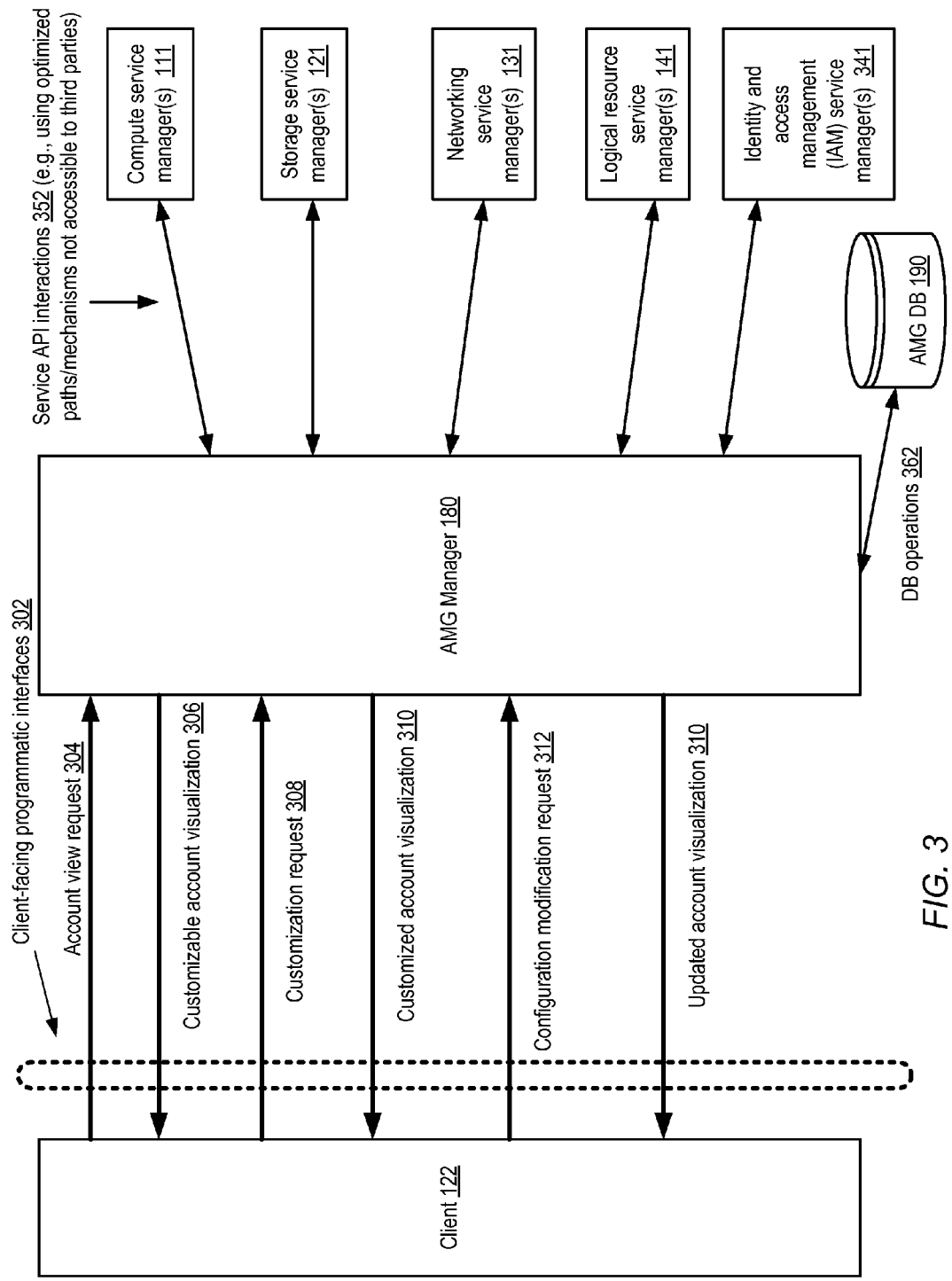
FIG. 3 illustrates example interactions between clients and an account metadata graph manager, according to at least some embodiments.

FIG. 3 illustrates example interactions between a client 122 and an account metadata graph manager 180, according to at least some embodiments. As shown, a client 122 may submit an account view request 304 indicating a particular client account with which the client 122 is affiliated, and to which the client 122 has access and/or modify permissions. The request may be formatted in accordance with an appropriate client-facing programmatic interface 302 in some embodiments: for example, a link on a web-based console page for one of the services used by the client may be used, or a different GUI may be used, or an API call may be issued in various embodiments. In at least some embodiments, the programmatic interface to be used for submitting the view request may not require the client to submit any additional authorization information. E.g., if a client is already logged on to a web-based console page for a service, and issues the view request using a link within the console page, the AMG manager 180 may use the credentials associated with the pre-existing client session, together with the AMG manager's own authorization permissions, to obtain the metadata to be used for the graph representation. Thus, in such embodiments the client may not have to submit credentials simply for the purpose of obtaining a graphical view of the client account, thereby helping to reduce the probability of security breaches.

In response to the account view request, the AMG manager 180 may verify that the requester is authorized to view the account metadata, e.g., by issuing a query to an identity and access management (IAM) service 341 using one or more IAM service APIs. If the requester is determined to have the appropriate roles/permissions/capabilities, the AMG manager 180 may next determine whether a sufficiently recently-generated graph representation of the indicated client account already exists, e.g., by a lookup in the AMG DB 190.

If the graph representation does not already exist, or if the graph representation needs to be updated in accordance with a staleness policy for the account's metadata, the AMG manager may issue one or more API calls to various services of the provider network 102 to which the client may have access. In the depicted embodiment, for example, one or more of the service managers 111, 121, 131, 141 or 341 may implement a respective set of administrative APIs, which may be used by the AMG manager 180 for the service API interactions 352 performed as a result of the client's request. In at least some embodiments, the AMG manager 180 may be configured to use optimized private or internal mechanisms, not accessible or exposed to third parties (e.g., business entities other than the provider network operator and the clients) or to the clients themselves, to obtain at least some of the metadata from the service managers in interactions 352. For example, in some implementations, some such non-public administrative operations may only be allowed if they are requested by trusted entities (such as the AMG manager 180) within the provider network 102. In some such implementations, it may be feasible to obtain information about certain types of configuration relationships efficiently using internal-use-only administrative data paths and corresponding APIs to which clients and entities outside the provider network are not granted access or exposure. In some implementations, specific authorization roles or capabilities may be granted to the AMG manager 180 to allow it to utilize one or more of (a) specific internal APIs for obtaining metadata and (b) optimized networking paths and/or other resources reserved for internal administrative use within the provider network. Such authorization permissions may be reserved for the AMG manager and/or administrative entities of the provider network, and may not be obtainable by clients or third parties. A staleness policy associated with the client's account may be maintained by the AMG manager in at least some embodiments, governing how frequently an AMG 124 needs to be refreshed (or how long an AMG 124 can be cached before re-querying various services for possible updates). In some embodiments the account view request may include one or more parameters indicating, for example, the specific set of services and/or resources for which metadata is to be included in the AMG 124, whether the metadata used for the AMG 124 is to be refreshed (so that the most current metadata possible is reflected in the AMG) or whether an older version of the metadata is sufficient, sets of provider network locations (e.g., geographic regions, data centers or availability containers) the client is most interested in, relative priorities from the client's perspective for the metadata of different services or resources, and/or other filters that may be useful in reducing the effort required to respond to the client's request. The AMG manager 180 may obtain the metadata from the various services, e.g., based on the client's request, and construct or refresh the AMG for the client account. Various resources allocated to or used by the client account may be represented as nodes in the AMG 124, and the graph edges may represent relationships among the nodes. Attributes that are not represented by edges may also be stored for various resources and/or services in the AMG in some implementations. If a sufficiently up-to-date AMG 124 already exists, that AMG may be retrieved from the AMG database 190, e.g., instead of obtaining the metadata again from the services. In some implementations, multiple versions of an AMG 124 may be stored in the AMG database 190, and the most recent version may be examined in response to a client request, e.g., to determine if it is recent enough, before generating a new version. In at least some embodiments, the AMG manager may provide the graph representation in accordance with one or more versions of the World Wide Web Consortium Document Object Model (W3C DOM) or some other document object model (e.g., for rendering and/or manipulation using JavaScript or any appropriate language by web browsers and/or other interfaces).

Having obtained or generated an AMG 124 for the client, the AMG manager 180 may then present a corresponding customizable account visualization 306 to the client 122 via any appropriate client-facing programmatic interface 302. In some embodiments, the AMG may be represented as a hyperbolic tree, and a hyperbolic tree browser interface may be provided, which allows the client to focus in on any desired portion of the tree to obtain the desired level of detail. A fish-eye lens view of the selected portion of the graph may be displayed in one implementation, and the client may, using graphical interactions such as drag and drop operations, change the portion of the graph that is shown in detail or in focus. In other embodiments, other visualizations may be used, such as a map view similar to that provided by various geographical mapping services, or a different type of browser may be used. In some embodiments the visualization interface may be accessed by clicking on a link provided in a service console interface—e.g., a use that is logged on to a compute service console's web page may be able to obtain the visualization using a link provided from that web page. In another embodiment, the visualization may be accessed using a standalone program or tool.

The client 122 may view the provided visualization, and submit a customization request 308 to change some aspect of the visualization if desired in the depicted embodiment. Customization requests may include, for example, requests to remove/filter specified types of nodes or edges, change the color or symbols used for various elements of the graph, change the level of detail provided, use a different visualization interface, and so forth. In response to the customization request 308, the AMG manager 180 may make the requested changes and provide a modified customized visualization 310 to the client 122.

In at least some embodiments, the client 122 may be authorized to make configuration changes to one or more resources and/or services. In such embodiments, the client 122 may submit, e.g., via a graphical interaction with an AMG's visualization, a configuration modification request 312. Such graphical interactions may include, for example, disconnecting nodes, moving edges, or selecting from a drop-down menu of available configuration modification actions. Upon receiving such a modification request, and verifying that the client has the requisite permissions, in some embodiments, the AMG manager 180 may submit one or more service API calls to the appropriate services. If the AMG manager determines (e.g., from return codes of the API calls) that the modification API calls succeeded, the visualization may be modified accordingly to reflect the configuration changes, and an updated account visualization 310 may be provided to the client. A recent modification change may be highlighted (e.g., for some configurable time period after the change occurred) in the visualization in at least some embodiments, e.g., with the portions to be highlighted being selected based on audit trail records being maintained by the AMG manager for configuration changes. If the modification failed, or the client was not authorized, appropriate error messages may be displayed to the client in the depicted embodiment. Client preferences, including for example visualization-related preferences for color schemes, symbols/icons, and the like may be stored in the AMG database 190 in some implementations. The AMG DB may also be used to store persistent representations of the AMGs, e.g., as data structures in binary or text format in some embodiments. In some embodiments a configuration audit trail may be stored in the AMG database 190 as well.

In some embodiments, clients may be able to assign or grant permissions to some types of resources of the provider network. For example, when performing certain configuration operations associated with an application running on a compute instance (such as accessing a remote storage object, or changing a network configuration setting), it may be preferable to grant permissions and associated (often temporary) credentials to the application, instead of using the client's own credentials each time such configuration changes are required. Assigning roles/capabilities/permissions with corresponding temporary credentials to resources or applications within resources may also help in reducing the chances of compromising the security of the client's own credentials (e.g., by inadvertently revealing the client's credentials). In at least some embodiments, clients 122 may be able to assign roles, capabilities, or configuration permissions to nodes representing resources in an AMG 180 via graphical interactions with the AMG's visualization. For example, in the case of a compute instance, a role may be assigned to the operating system (or a component of an operating system) running on the compute instance, or to an application running on the compute instance in at least some embodiments. The operating system or the application may then be able to obtain credentials (e.g., a user identifier and a password) from the IAM service manager 341. In some implementations, the credentials may remain valid for a time period and then expire (thus requiring new credentials if the authorization is to continue).

Figure 4:
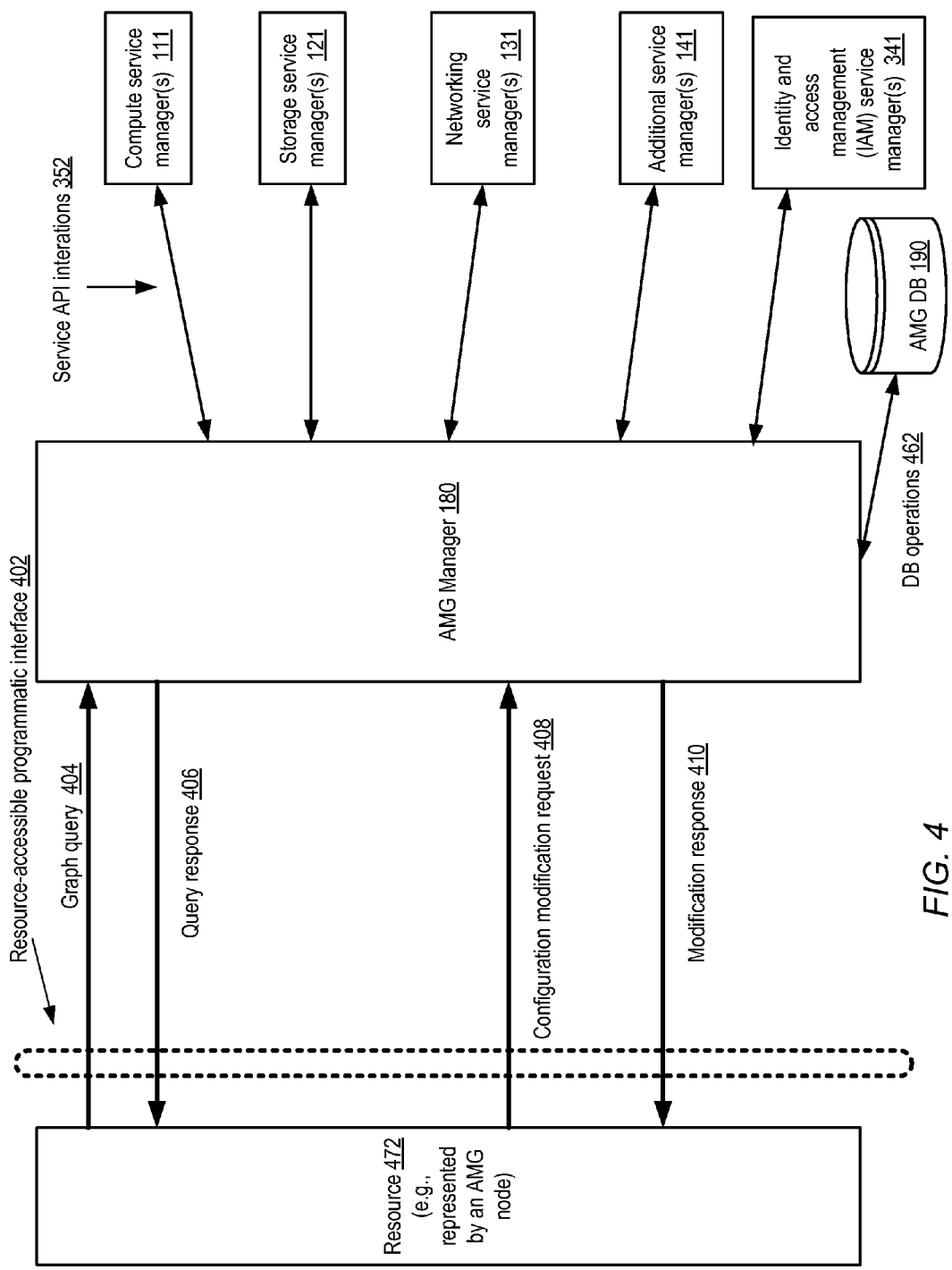
FIG. 4 illustrates example interactions between a resource represented in an account metadata graph, and an account metadata graph manager, according to at least some embodiments.

After a resource represented in an AMG is granted authorization (e.g., via being granted a role, capability or permission), in some embodiments the resource may be able to use one or more programmatic interfaces to query and/or perform configuration changes via interactions with the AMG manager 180. FIG. 4 illustrates example interactions between a resource represented in an AMG, and an AMG manager, according to at least some embodiments. As shown, one or more resource-accessible programmatic interfaces (such as APIs) 402 may be supported by the AMG manager 180. The resource 472 may submit a graph query 404 to the AMG manager 180 via a particular programmatic interface 402. In response, after verifying that the resource has the necessary authorization, the AMG manager 180 may obtain (e.g., by looking up the appropriate AMG in the AMG database 190, or by generating/refreshing an AMG using API calls to various services) an AMG representing at least a subset of the resources associated with the client account, in a manner similar to some of the operations performed in response to the client account view request 304 described above.

In some embodiments, node-level authorization information associated with the requesting resource 472 may restrict the amount of metadata that can be provided to the resource. For example, a query depth limit Q may be associated with a node N1 representing the resource 472, indicating that the configuration information that can be provided to the resource 472 by the AMG manager is to be limited to the information associated with those nodes that can be accessed by traversing at most Q edges from N1. The AMG manager 180 may provide a query response 406 to the requesting resource 472, comprising the requested configuration information (within the constraints of the authorization granted to the requesting resource 472) in a machine-readable format in the depicted embodiment. A machine-readable representation of at least a portion of the AMG 124 may be provided to the resource 472 in some embodiments, e.g., in the form of an XML (Extended Markup Language) document, a JSON (JavaScript Object Notation) document, or in some other appropriate format.

In embodiments in which the resource 472 is granted the ability to perform configuration changes, the resource 472 may submit a configuration change request 408 via one of the interfaces 402. After validating the requester's authorization, the AMG manager may issue one or more API calls to the appropriate services to initiate the configuration changes.

Depending, for example, on the results of the API calls, a modification response 410 indicating the success (or failure) of the requested changes may be provided to the resource 472. It is noted that in at least some embodiments, a client 122 may also use the resource-accessible programmatic interfaces for querying the AMG manager and/or for configuration changes. For example, a client that does not wish to use the visualization interfaces provided by the AMG manager may achieve similar results programmatically (e.g., using the interfaces 402) as can be achieved via the visualizations.

Figure 5:
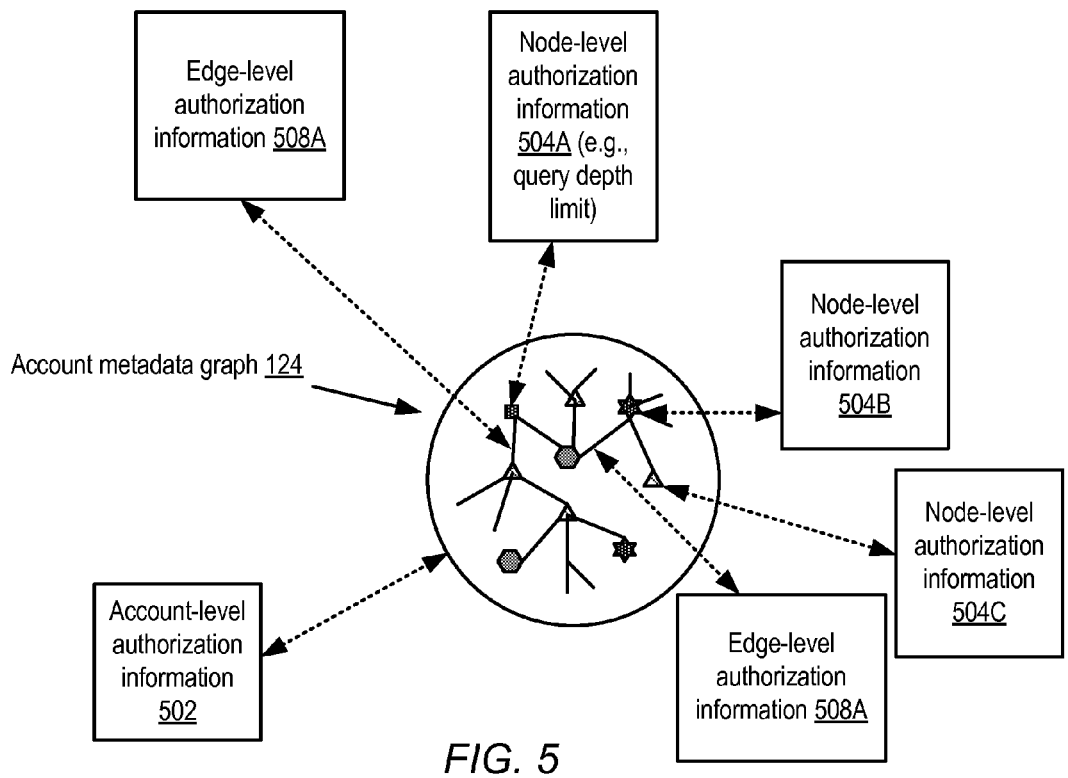
FIG. 5 illustrates examples of authorization metadata that may be associated with an account metadata graph, according to at least some embodiments.

As noted earlier, the kinds of account information that can be provided to various users and/or resources may be dependent on authorization granted to the users or resources, in at least some embodiments. FIG. 5 illustrates examples of authorization metadata that may be associated with an account metadata graph 124, according to at least some embodiments. Some types of authorization information (e.g., information 502 in FIG. 5) may be maintained at the client account level, governing for example which entities are allowed to view, query, or modify the AMG 124 as a whole. In some implementations, different nodes of the AMG may have respective sets of authorization information, such as node-level authorization information 504A, 504B or 504C. Node-level authorization information for a given node N1 may be used by the AMG manager 180 to respond to at least two types of requests in some embodiments: (a) requests to view or change configuration information about the node, received from clients or other entities not represented in the AMG and (b) requests from the entity representing the node itself, e.g., queries or configuration modification requests received via a resource-accessible programmatic interface 402 from the resource represented by node N1. In one embodiment, some or all of the nodes may have respective query depth limits governing how much configuration information (expressed in terms of the number of edges that can be traversed to obtain the information, starting from the node where the query originates) can be provided to the resource represented by the node.

In one embodiment, authorization information for one or more edges (such as information 508A and 508B in FIG. 5) may also or instead be maintained, indicating which entities are permitted to perform configuration operations associated with one or both of the nodes linked by a given edge of the AMG. The various types of authorization information illustrated in FIG. 5 may be stored in the AMG database 190 in some implementations, e.g., together with, or as part of, persistently-stored representations of the AMGs. In at least some embodiments, one or more of the different types of configuration information illustrated in FIG. 5 may be displayed in the visualizations provided to clients. Such displays may be explicit (e.g., a client may be able to view, using a right-click or a drop-down action, the authorization information associated with a node, an edge, or the AMG as a unit) in some implementations, while in other implementations at least some of the authorization information may be implicit or encoded (e.g., some nodes/edges may be greyed out or removed from the visualization, or color-coding may be used to indicate the permissions that a client has on a given node or edge).

Figure 6:
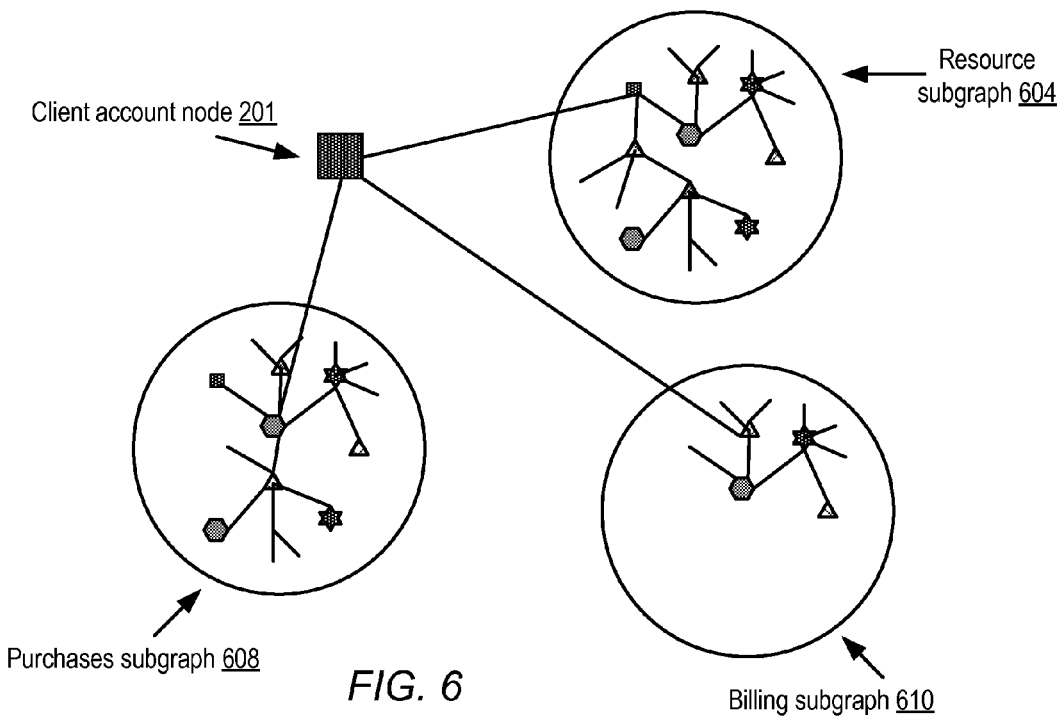
FIG. 6 illustrates examples of types of sub-graphs that may be associated with a client account, according to at least some embodiments.

In some embodiments, other types of information pertaining to a client account, in addition to resource configuration information, may be included in an AMG 124, e.g., in the form of respective sub-graphs or sub-trees. FIG. 6 illustrates examples of types of sub-graphs that may be associated with a client account, according to at least some embodiments. As shown, a client account node 201 of an AMG may be linked to a plurality of sub-graphs, including three example sub-graphs 604, 608 and 610. Sub-graph 604 may represent the resources assigned to, allocated to, or used by the client account, and may comprise nodes similar to those illustrated in FIG. 2. Sub-graph 608 may include records of purchases or rentals associated with the client account in the depicted embodiment. For example, in some embodiments the provider network may include one or more retail web sites selling (or renting) various products or content such as books, videos, compact discs, and the like, and information about the purchases made by users affiliated with the client account may be displayed in sub-graph 608. The nodes of sub-graph 608 may indicate for example the objects or content bought or rented in one implementation, while the edges may indicate the sequence in which the objects/content was rented, or may indicate similarity of the objects or content represented by the nodes.

In some embodiments, clients may be able to browse or examine their billing history using a sub-graph of the AMG, such as sub-graph 610. The billing sub-graph 610 may include nodes representing one or more billing statements, for example, and the edges may represent the sequence in which the billing statements were generated, or may link billing statements that include charges for a common set of resources. In at least one embodiment, the AMG may show links between the billing sub-graph 610 and the resource sub-graph 604. For example, by clicking on a particular node B in the billing history sub-graph, one or more resource nodes in the resource sub-graph 604 may be highlighted or linked, indicating that billing for those resources was included in the billing amounts associated with node B. Or, alternatively, by submitting a request for billing details via a graphical interaction associated with a particular node R in the resource sub-graph 604, a client may be able to see nodes in the billing history sub-graph in which billing costs associated with using the resource corresponding to R may be represented. In at least one embodiment, a customer support sub-graph may also be provided, in which interactions between users affiliated with the client account and the customer support organizations associated with various services of the provider network may be represented as nodes.

Methods for Providing Account Metadata Graphs

Figure 7:
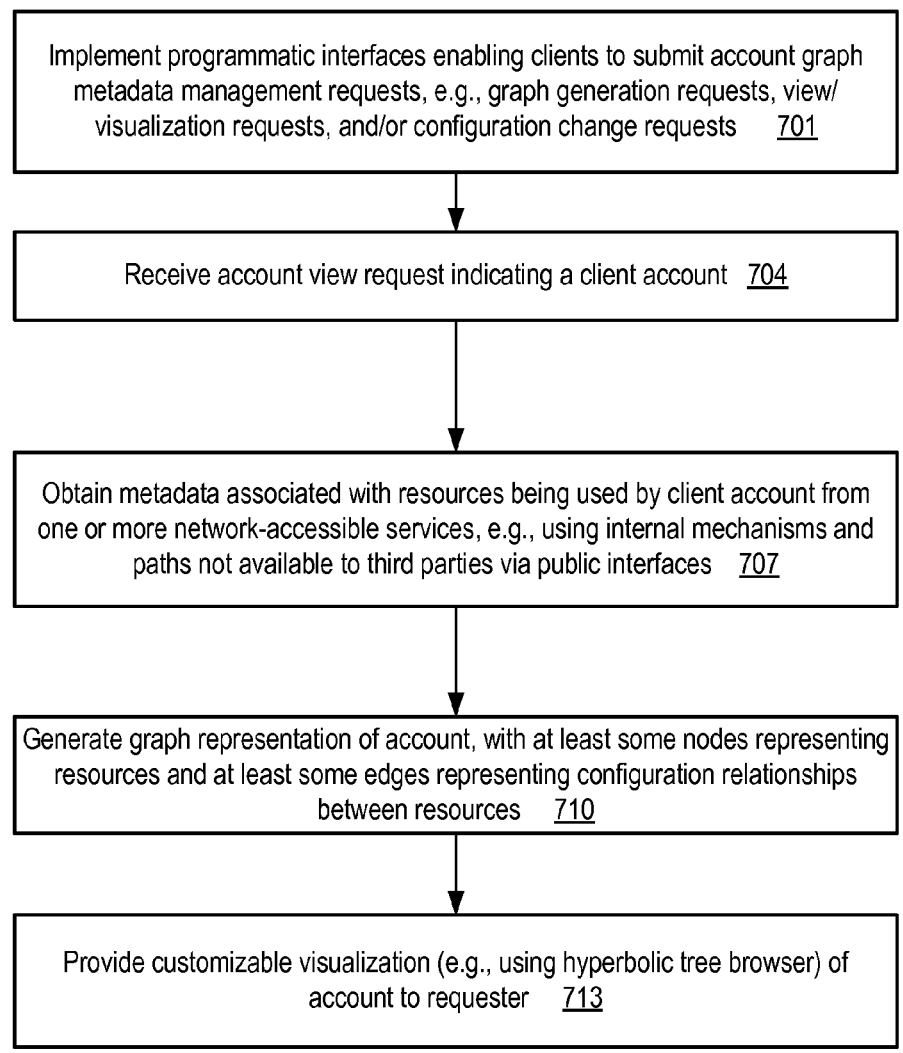
FIG. 7 is a flow diagram illustrating aspects of operations that may be performed to support client access to account metadata graphs, according to at least some embodiments.

FIG. 7 is a flow diagram illustrating aspects of operations that may be performed to support client access to account metadata graphs, according to at least some embodiments. As shown in element 701, one or more programmatic interfaces may be implemented (e.g., by AMG manager 180) to enable clients to submit account metadata management requests, such as graph generation requests, account view requests, visualization requests, and/or configuration change requests. A variety of different types of interfaces may be implemented in different embodiments, such as web sites, APIs, custom GUIs, or command-line tools. An account view request, indicating a particular client account of which a visualization or a graph representation is desired, may be received (element 704), for example by an AMG manager 180 in the depicted embodiment. In some embodiments, a graph generation request may be sent separately from an account view request, i.e., a graph representing a client account may be generated at the client's request before an account view request can be handled; in other embodiments, an account view request may be considered to comprise an implicit graph generation request.

In the depicted embodiment, the AMG manager 180 may obtain metadata associated with the resources being used by the client account from one or more of the provider network's services (element 707), e.g., by issuing various API calls according to the respective APIs defined by the services. In one embodiment, at least some of the interfaces, mechanisms, resources or paths used by the AMG manager to obtain the metadata may be private or internal (e.g., not accessible by any third parties via any publicly-available interfaces). In one implementation, one or more optimization techniques (e.g., re-using metadata already obtained for a different administrative purpose like billing, or provider network health monitoring) may be used to minimize the overhead associated with the metadata collection by the AMG manager. As noted earlier, in some embodiments, the client's request may indicate which services are to be queried for metadata, while in other embodiments, the AMG manager 180 may determine which services are to be queried. In one implementation, a set of client preferences (which may be stored in and retrieved from the AMG database 190 as needed, or may be specified as account view parameters) may indicate which services or resources are to be included in the view or graph, or an order in which various services should be queried for metadata, or the subset of locations of the provider network from which metadata should be retrieved.

Having retrieved the metadata, the AMG manager 180 may generate a graph representation of the account metadata in the depicted embodiment, comprising a plurality of nodes and one or more edges (element 710). At least some of the nodes may represent resources assigned to or used by the client account, and at least some of the edges may indicate configuration relationships established between the resources on behalf of the client. A customizable visualization of the metadata may be provided to the client (element 713) in some embodiments, e.g., via a hyperbolic tree browser or other appropriate visualization mechanism. In at least some embodiments the visualization mechanism may allow the client to focus on a portion of the graph at a time, e.g., via an interface emulating a fish-eye lens that provides detailed information about a selectable subset of the nodes/edges and displays a high-level overview of the remainder of the graph.

In one embodiment, in which for example the AMG manager 180 may support several different types of sub-graphs such as those illustrated in FIG. 6, the type(s) of sub-graphs to be included in the view may be indicated in the account view request or the graph generation request. In other embodiments, the AMG manager 180 may determine the set of sub-graphs to be generated or displayed. In some embodiments, when an account view request or a graph generation request is received, the AMG manager 180 may first check whether it already has a graph that is recent enough to respond to the request, e.g., in an in-memory cache or in the AMG database 190, and if an appropriate graph is found, a new graph may not be generated. In at least some implementations, persistent representations of one or more versions of the AMGs 124 and/or the visualizations may be stored in the AMG database 190.

Figure 8:
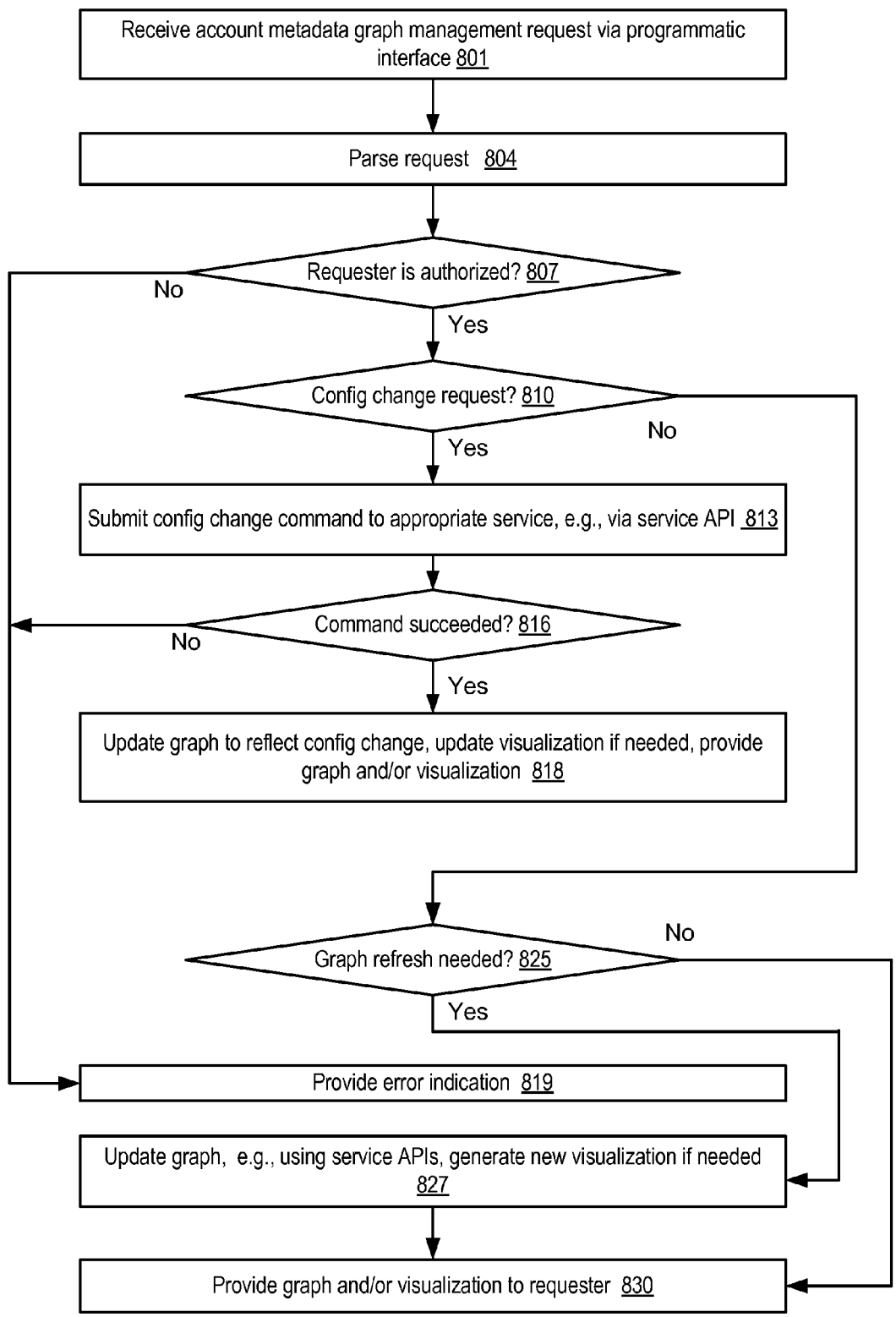
FIG. 8 is a flow diagram illustrating aspects of operations that may be performed in response to different types of operation requests on existing account metadata graphs, according to at least some embodiments.

FIG. 8 is a flow diagram illustrating aspects of operations that may be performed in response to different types of operation requests on existing account metadata graphs, according to at least some embodiments. As shown in element 801, an AMG management request may be received, e.g., by the AMG manager 180 via a programmatic interface. The request may be issued, for example, by a client 122 (e.g., a user affiliated with a client account), or by a resource that is represented in the AMG. The request may be parsed (element 804) to determine the types of operations (e.g., read-only queries or configuration changes) being requested, and the identity of the requester may be determined. If the requester is not authorized to perform the requested operations (as determined in element 807), an error indication may be provided (element 819), e.g., by displaying an error message via the programmatic interface. In some embodiments, to determine whether the requester is authorized, the AMG manager 180 may issue one or more API calls to an identity and access management (IAM) service of the provider network, and/or may look up cached authorization information associated with the requester in the AMG database 190.

If the requester has the required authorization to perform the operations (as also determined in element 807), the AMG manager may determine whether the operations are read-only or not. If the operations comprise configuration changes (as determined in element 810), the AMG manager 180 may transmit one or more configuration change commands to the appropriate service(s) (element 813), e.g., using one or more service API calls. If the commands succeed (as determined in element 816), the existing AMG and/or its visualization may be updated to reflect the configuration change(s) (element 818), and the graph or visualization may be provided to the requester. It is noted that whether a visualization is provided may depend on the AMG management request (and requester) in some embodiments—e.g., if the request is received via an API rather than a GUI interaction, and does not explicitly call for a visualization, the response may not include a visualization. If the configuration change commands fail, an error indication may be provided (which may also involve generating a modified graph and/or visualization that indicates the occurrence of the error in some implementations) (element 819).

If the AMG management request did not include a configuration change request, as also determined in element 810), the AMG manager 180 may determine whether a graph refresh or regeneration is needed (element 825). The decision as to whether the graph needs to be refreshed or not may be based on different criteria in various embodiments. In one embodiment, one or more client accounts may have an associated staleness policy indicating how often the corresponding AMG needs to be updated. A default account staleness policy may be applied if a client does not specify one in some embodiments, indicating for example that AMGs should be refreshed at least once every X hours or days. In another embodiment, the client's request may indicate whether the AMG should be refreshed, or if a version of the AMG that was generated as much as Y hours earlier would be sufficient to respond to the request. If the AMG manager determines that a refresh is needed, the appropriate services may be queried to obtain the latest metadata in the depicted embodiment, and the graph and/or visualization may be updated (element 827), e.g., if the metadata has changed since the metadata was previously retrieved. The graph and/or visualization may then be provided to the requester (element 830). If it is determined that no refresh is needed (element 825), the pre-existing graph and/or visualization may be provided (element 830).

Figure 9:
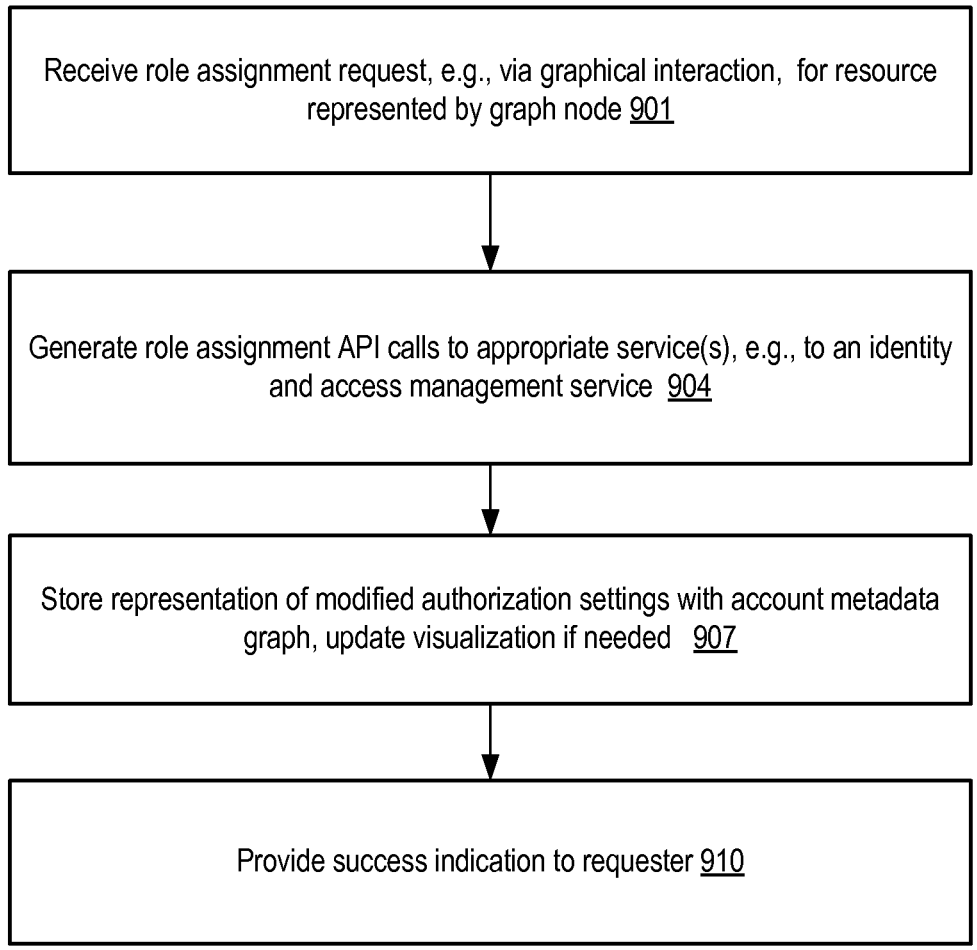
FIG. 9 is a flow diagram illustrating aspects of operations that may be performed to assign an authorization role to a resource node represented in an account metadata graph, according to at least some embodiments.

As noted earlier, in at least some embodiments, one or more resources represented in an AMG may be granted roles/capabilities/permissions enabling the resources to initiate or perform various types of configuration operations. In at least some embodiments, a client may use the visualization provided by the AMG manager to modify such authorization-related properties (e.g., to assign a role to a resource, or change/remove the role of a resource). FIG. 9 is a flow diagram illustrating aspects of operations that may be performed to assign an authorization role to a resource node represented in an account metadata graph, according to at least some embodiments. As shown in element 901, a role assignment request may be received by the AMG manager 180, e.g., via a graphical interaction with a visualization of an AMG. The role assignment request may indicate the target resource (represented by a node in the AMG) whose authorization settings are to be modified, and the role to be assigned to that resource.

In response to the role assignment request, the AMG manager may first verify that the requester is authorized to assign the role. If the requester is authorized, the AMG manager 180 may generate one or more role assignment API calls to the appropriate service(s) of the provider network, such as an identity and access management (IAM) service (element 904). If the API calls succeed, in the depicted embodiment the AMG manager 180 may store a representation of the modified authorization settings with the AMG (e.g., in the AMG database 190), and update the visualization to reflect the role assignment as well (e.g., the color of the symbol being used for the node to which the role has been assigned may be changed in one implementation) (element 907). A response to the entity that submitted the role assignment request may be provided in some embodiments (element 910), indicating that the request succeeded. In some embodiments the absence of an error message may serve as the equivalent of a response indicating success. In one embodiment, a resource R represented in an AMG by a node N may be granted a role enabling R to in turn assign roles to other resources, and operations similar to those illustrated in FIG. 9 in the context of graphical interactions may be performed without graphical interactions, e.g., via API calls issued by such a resource R It is noted that in various embodiments, the operations illustrated in the flow diagrams of FIG. 6, 7, 8 or 9 may be performed in a different order than that shown, or may be performed in parallel. In some embodiments some of the operations illustrated in FIG. 6-FIG. 9 may be omitted.

Use Cases

The techniques described above, of providing unified graph representations and corresponding visualizations of comprehensive client account metadata, may be useful in a variety of different scenarios. For example, as the number of resources and/or services of a provider network that are used by entities associated with a given client account increases, it may become difficult to obtain a big-picture overview of the account. Managers of a company that has set up a client account with a provider network, and has hundreds or thousands of individual users acquiring, using, and releasing resources of the provider network may, for example, not be fully cognizant of the nature and complexity of their company's interactions with the provider network. Obtaining periodic summary graphical overviews of the company's use of provider network resources may help, for example, with budget planning.

The account metadata graph functionality may also help reduce the number of UI interactions needed from technical users of the provider network's services. For example, a given resource such as a virtual compute instance may be associated with a variety of other resources such as different storage devices, networking objects, security objects and the like, and a user may have to switch between several different UIs to try to get a complete view of the resource's configuration relationships. Providing customizable visualizations that may enable users to select and view at a glance, from multiple services and for multiple resources, the types of configuration information that is of greatest interest to them, may lead to increased productivity and increased satisfaction levels with the provider network services.

Illustrative Computer System

Figure 10:
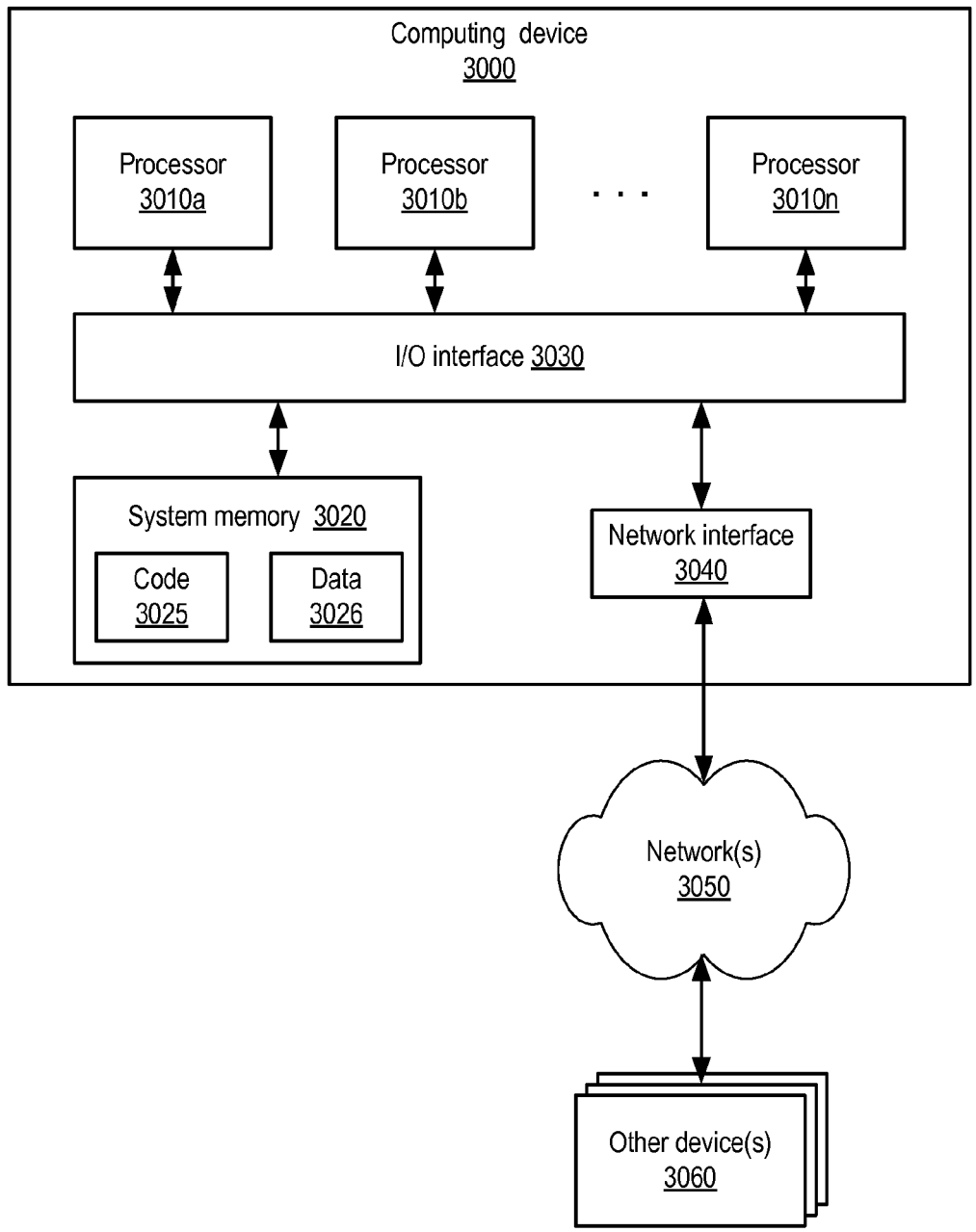
FIG. 10 is a block diagram illustrating an example computing device that may be used in at least some embodiments.

In at least some embodiments, a server that implements a portion or all of one or more of the technologies described herein, including the techniques to generate, store and display account metadata graphs, may include a general-purpose computer system that includes or is configured to access one or more computer-accessible media. FIG. 10 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 9, including various devices serving as entropy sources, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising one or more computing devices configured to:
   receive an indication of a client account of a provider network, wherein the client account is associated with respective sets of resources of one or more network-accessible services of the provider network;
   obtain metadata pertaining to the respective sets of resources from the one or more network-accessible services, wherein at least a portion of the metadata is obtained using a private administrative mechanism of the provider network;
   generate a graph representation of the metadata comprising a plurality of nodes and a plurality of edges linking respective pairs of nodes, wherein a first node and a second node of the plurality of nodes represent a respective first and second resource associated with the client account, and an edge between the first node and the second node represents a configuration relationship established on behalf of the client between the first and second resources;
   provide, via a programmatic interface, a customizable visualization of resources and configuration relationships included in the graph representation, wherein the programmatic interface enables submissions of one or more configuration modification requests via graphical interactions; and
   in response to an authorized graphical interaction received via the programmatic interface, issue one or more commands to a service of the one or more network-accessible services to implement a particular configuration modification associated with at least one resource of the first and second resources.

2. The system as recited in claim 1, wherein the one or more computing devices are configured to:
   determine whether the one or more commands succeeded, and
   in response to a determination that the one or more commands succeeded, dynamically modify the visualization to reflect the particular configuration modification.

3. The system as recited in claim 1, wherein the customizable visualization comprises a hyperbolic tree browser view of at least a subset of the plurality of nodes and the edges linking the subset of the plurality of nodes.

4. The system as recited in claim 1, wherein the one or more computing devices are configured to:
   utilize authorization information associated with the graph representation to determine contents of the customizable visualization to be displayed, wherein the authorization information comprises one or more of (a) account-level authorization information associated with the client account, (b) node-level authorization information associated with corresponding resources of the provider network, or (c) edge-level authorization information associated with configuration operations on the resources of the provider network.

5. The system as recited in claim 1, wherein the plurality of nodes comprises a third node and a fourth node, wherein the first node represents a compute server allocated to the client account by a compute service of the provider network, the second node represents a storage object allocated to the client account by a storage service of the provider network, the third node represents a network device usable by the virtual compute server and provided by a networking service of the provider network, and the fourth node represents a logical resource accessible to the compute server and implemented by a different service of the provider network.

6. The system as recited in claim 1, wherein to obtain the at least a portion of the metadata using the private administrative mechanism, the one or more computing devices are configured to utilize at least one of: (a) an administrative programmatic interface accessible only to trusted entities within the provider network, (b) a network path accessible only to trusted entities within the provider network, (c) an optimization technique to re-use previously-collected metadata, or (d) an authorization permission granted to an account metadata graph manager component of the provider network.

7. A method, comprising:
   obtaining, from one or more network-accessible services of a provider network, metadata pertaining to respective sets of service resources associated with a client account of the provider network, wherein at least some of the metadata is obtained using a non-public mechanism;
   generating a graph representation of the metadata comprising a plurality of nodes and a plurality of edges linking respective pairs of nodes, wherein a first node and a second node of the plurality of nodes represent a respective first and second resource associated with the client account, and an edge between the first node and the second node represents a configuration relationship established between the first and second resources;
   providing a visualization of resources and configuration relationships included in the graph representation, including the first and second resources and the configuration relationship; and
   in response to a particular authorized graphical interaction received via a programmatic interface associated with the visualization, issue one or more commands to a service of the one or more network-accessible services to implement a configuration modification associated with at least the first resource.

8. The method as recited in claim 7, further comprising:
   determining whether the one or more commands succeeded, and
   in response to determining that the one or more commands succeeded, dynamically modifying the visualization to reflect the configuration modification.

9. The method as recited in claim 7, further comprising:
   providing another programmatic interface enabling an entity represented by a node of the graph representation to submit a query directed to at least a portion of the graph representation; and
   in response to a query received from the entity via the other programmatic interface, providing configuration information to the entity about at least one other node of the graph representation.

10. The method as recited in claim 7, wherein the visualization comprises a hyperbolic tree providing a graphical control enabling a user to change the subset of nodes for which details are provided in the visualization.

11. The method as recited in claim 7, further comprising:
   utilizing authorization information associated with the graph representation to determine contents of the visualization to be displayed, wherein the authorization information comprises one or more of (a) account-level authorization information associated with the client account, (b) node-level authorization information associated with corresponding resources of the provider network, or (c) edge-level authorization information associated with configuration operations on the resources of the provider network.

12. The method as recited in claim 11, further comprising:
   displaying a representation of at least a portion of the authorization information within the visualization.

13. The method as recited in claim 11, wherein the node-level authorization information associated with a particular node includes a query depth limit limiting a number of edges that can be traversed in response to a request from a resource represented by the particular node.

14. The method as recited in claim 7, further comprising:
   highlighting, within the visualization, at least one node selected from among the plurality of nodes based on a determination that a configuration property associated with the at least one node was changed within a time window.

15. The method as recited in claim 7, further comprising:
   initiating a modification of an access policy associated with one or more resources associated with the client account, based at least in part on another authorized graphical interaction.

16. The method as recited in claim 7, further comprising:
   initiating an assignment of one or more authorization permissions to the first resource to enable the first resource to perform a particular set of operations on another resource of the provider network, based at least in part on another authorized graphical interaction received via a different programmatic interface, wherein said initiating comprises sending a request to an identity and access management service implemented in the provider network.

17. The method as recited in claim 7, wherein the graph representation includes (a) a particular node representing the client account (b) an additional node representing a different account associated with the provider network and (c) an edge linking the particular node and the additional node, indicative of at least one of: a parent-child relationship between the client account and the different account, or a provider-consumer relationship between the client account and the different account.

18. The method as recited in claim 7, wherein the graph representation includes a particular node representing one or more of: (a) billing history information associated with the client account, or (b) content purchase records associated with the client account and a digital content service implemented in the provider network.

19. The method as recited in claim 7, further comprising:
   implementing, to enable programmatic access to the graph representation, at least one of (a) a representational state transfer application programming interface (REST API) or (b) a Simple Object Access Protocol (SOAP) API.

20. The method as recited in claim 7, further comprising:
   utilizing, to obtain the at least some of the metadata using the non-public mechanism, one or more of: (a) an administrative programmatic interface accessible only to trusted entities within the provider network, (b) a network path accessible only to trusted entities within the provider network, (c) an optimization technique to re-use previously-collected metadata, or (d) an authorization permission granted to an account metadata graph manager component of the provider network.

21. A non-transitory computer-accessible storage medium storing program instructions that when executed on one or more processors:
   obtain metadata associated with a client account of a provider network, including at least some metadata obtained via an internal mechanism of the provider network;
   generate a graph representation of the metadata, wherein the graph representation comprises a plurality of nodes and a plurality of edges linking respective pairs of nodes, wherein a first node and a second node of the plurality of nodes represent a respective first and second resource of the provider network associated with the client account, and an edge between the first node and the second node represents a configuration relationship established between the first and second resources;

provide a visualization of resources and configuration relationships included in the graph representation, including the first and second resources and the configuration relationship; and in response to a particular authorized graphical interaction received via a programmatic interface associated with the visualization, issue one or more commands to a network-accessible service of the provider network to implement a configuration modification associated with at least the first resource.

22. The non-transitory computer-accessible storage medium as recited in claim 21, wherein the instructions when executed on the one or more processors:

provide another programmatic interface enabling an entity represented by a node of the graph representation to submit a query directed to at least a portion of the graph representation; and in response to a query received from the entity via the other programmatic interface, provide configuration information to the entity about at least one other node of the graph representation.

23. The non-transitory computer-accessible storage medium as recited in claim 21, wherein the visualization comprises a hyperbolic tree browser providing a fish-eye lens emulation interface.

24. The non-transitory computer-accessible storage medium as recited in claim 21, wherein the instructions when executed on the one or more processors:

utilize authorization information associated with the graph representation to determine contents of the visualization to be displayed, wherein the authorization information comprises one or more of (a) account-level authorization information associated with the client account, (b) node-level authorization information associated with corresponding resources of the provider network, or (c) edge-level authorization information associated with configuration operations on the resources of the provider network.

25. The non-transitory computer-accessible storage medium as recited in claim 21, wherein the instructions when executed on the one or more processors:

initiate an assignment of an authorization role to the first resource to enable the first resource to perform a particular set of operations on another resource of the provider network, based at least in part on another authorized graphical interaction received via a different programmatic interface.

26. The non-transitory computer-accessible storage medium as recited in claim 21, wherein the graph representation includes (a) a particular node representing the client account (b) an additional node representing a different account associated with the provider network and (c) an edge linking the particular node and the additional node, indicative of at least one of: a parent-child relationship between the client account and the different account, or a provider-consumer relationship between the client account and the different account.

27. The non-transitory computer-accessible storage medium as recited in claim 21, wherein the graph representation includes a particular node representing one or more of: (a) billing history information associated with the client account, or (b) content purchase records associated with the client account and a digital content service implemented in the provider network.

28. The non-transitory computer-accessible storage medium as recited in claim 21, wherein to obtain at least some metadata using the internal mechanism, the instructions when executed on the one or more processors utilize one or more of: (a) an administrative programmatic interface accessible only to trusted entities within the provider network, (b) a network path accessible only to trusted entities within the provider network, (c) an optimization technique to re-use previously-collected metadata, or (d) an authorization permission granted to an account metadata graph manager component of the provider network.

29. The non-transitory computer-accessible storage medium as recited in claim 21, wherein to issue the one or more commands to the network-accessible service of the provider network to implement the configuration modification, the instructions when executed on the one or more processors utilize a private programmatic interface of the provider network.

30. The non-transitory computer-accessible storage medium as recited in claim 21, wherein the instructions when executed on the one or more processors:

provide the graph representation in accordance with a version of the World Wide Web Consortium Document Object Model (W3C DOM) standard.

* * * * *